United States Patent
Schedivy

(10) Patent No.: US 7,333,009 B2
(45) Date of Patent: Feb. 19, 2008

(54) OVERHEAD DISPLAY DEVICE FOR A VEHICLE

(75) Inventor: George C. Schedivy, Aquebogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 183 days.

(21) Appl. No.: 11/149,685

(22) Filed: Jun. 10, 2005

(65) Prior Publication Data
US 2007/0008094 A1 Jan. 11, 2007

(51) Int. Cl.
*B60Q 1/00* (2006.01)
(52) U.S. Cl. .................. 340/461; 340/438; 340/903
(58) Field of Classification Search ............... 340/438, 340/461, 691.1, 903, 904, 937; 348/148, 348/291, 837, 838; 296/24.1, 37.7, 37.8
See application file for complete search history.

(56) References Cited

U.S. PATENT DOCUMENTS

| | | | |
|---|---|---|---|
| 3,853,370 A | 12/1974 | Barnhart | 296/97 C |
| 4,090,732 A | 5/1978 | Vistitsky | 296/97 C |
| 4,623,188 A | 11/1986 | Juraschek et al. | 296/97 G |
| 4,806,904 A | 2/1989 | Watanuki | 340/103 |
| 5,145,128 A | 9/1992 | Umeda | |
| 5,356,192 A | 10/1994 | Schierau | 296/97.6 |
| 5,709,360 A | 1/1998 | Rosen | |
| 6,186,459 B1 | 2/2001 | Ma | |
| 6,304,173 B2 * | 10/2001 | Pala et al. | 340/461 |
| 6,352,226 B1 | 3/2002 | Gordon | |
| 6,557,812 B2 | 5/2003 | Kutzehr et al. | |
| 6,659,777 B1 | 12/2003 | Rondeau | |
| 6,663,155 B1 | 12/2003 | Malone et al. | 296/37.8 |
| 6,690,268 B2 | 2/2004 | Schofield et al. | 340/438 |
| 6,695,376 B1 | 2/2004 | Hirano | |
| 6,708,940 B2 | 3/2004 | Ligertwood | |
| 6,724,317 B1 * | 4/2004 | Kitano et al. | 340/691.1 |
| 6,752,444 B2 * | 6/2004 | Kitano et al. | 296/184.1 |
| 6,863,326 B1 | 3/2005 | Tiester et al. | 296/1.07 |
| 2004/0075639 A1 | 4/2004 | Lester et al. | 345/156 |
| 2004/0113866 A1 | 6/2004 | Aoki et al. | 345/7 |
| 2004/0141095 A1 | 7/2004 | Quinno et al. | |
| 2004/0212745 A1 | 10/2004 | Chang | 348/837 |
| 2005/0046756 A1 | 3/2005 | Chang | |
| 2006/0092127 A1 | 5/2006 | Chen | |

OTHER PUBLICATIONS

International Seach Report dated Nov. 5, 2007.
Written Opinion of the International Searching Authority dated Nov. 5, 2007.

* cited by examiner

*Primary Examiner*—Van T. Trieu
(74) *Attorney, Agent, or Firm*—F. Chau & Associates, LLC

(57) ABSTRACT

An overhead display for a vehicle that is capable of being moved along the guide bar in a vertical direction so that the display is not in a position to block the rear view is provided. The overhead display device for a vehicle may comprise a guide bar and a display coupled to the guide bar, wherein the display is capable of being moved along the guide bar in a vertical direction for locating the display at a selected position on the guide bar.

32 Claims, 13 Drawing Sheets

OVERHEAD DISPLAY DEVICE FOR A VEHICLE

TECHNICAL FIELD

The present disclosure relates to a vehicle display system, and more particularly to an overhead display system wherein the position of a display screen is adjustable.

DISCUSSION OF THE RELATED ART

Electronic devices such as entertainment systems and navigational systems are increasingly mounted in vehicles, for example, automobiles. While such electronic devices enhance the automobile user's driving experience, they also present automobile design challenges. Some of the devices used inside an automobile are known to be relatively small, easily mountable inside an automobile's interior, and are non-obstructive so as not to distract the driver.

Overhead display devices installed inside an automobile for viewers seated behind the front row of seats have become popular. Displays for a DVD player or a videogame player are known to be mounted in an overhead center position behind the driver seat row so as to be viewable by the riders in the backseat(s). With increasing popularity, video screens of in-vehicle entertainment systems have increased in size for an enhanced viewing experience.

Large displays can pose obstacles in the line-of-sight for the rearview mirror which is a critical driving-aid for a driver. An accident may occur if the driver is unable to see a clear rear view because a display is obstructing the driver's line-of-sight. Hence, to ensure driver safety and provide comfortable entertainment to backseat riders there is a need for a device and/or a system that provides the driver or backseat riders with the capability to adjust the positions of the display so that the display can be removed from the line-of-sight of the rearview mirror.

SUMMARY OF THE INVENTION

Exemplary embodiments of the present invention include an overhead display for a vehicle that is capable of being moved along a guide bar in a vertical direction so that a display is not in a position to block rear views.

In an embodiment of the present invention, an overhead display device for a vehicle comprises a guide bar, and a display coupled to the guide bar, wherein the display is capable of being moved along the guide bar in a vertical direction for locating the display at a selected position on the guide bar.

In another embodiment of the present invention, an overhead display device for a vehicle comprises a guide bar pivotally mounted to an overhead console of the vehicle, and a display coupled to the guide bar, wherein the display is capable of being moved along the guide bar for locating the display at a selected position on the guide bar.

In still another embodiment of the present invention, an overhead display device for a vehicle comprises a display, and two guide bars coupled at or near respective first and second ends of the display, wherein the display is capable of being moved along the two guide bars in a vertical direction for locating the display at a selected position on the two guide bars.

BRIEF DESCRIPTION OF DRAWINGS

Exemplary embodiments of the present invention can be understood in more detail from the following descriptions taken in conjunction with the accompanying drawings, of which.

DETAILED DESCRIPTION OF THE EXEMPLARY EMBODIMENTS

Exemplary embodiments of the present invention will now be described more fully hereinafter below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

An overhead display system in an embodiment of the present invention includes an overhead console, a display and a guide bar. The overhead console includes, for example, media players such as a compact disc (CD) player, a digital video disk (DVD) player, a video cassette player (VCP), a hard drive and/or a memory card reader. The media players in the overhead console receive data from data sources such as CDs, DVDs, video cassette tapes, a hard drive and/or a memory card for displaying the data on the display. The media players and the display can be electrically connected using electrical wires routed through the guide bar. Alternatively, the media players and the display can send and receive electrical signals for displaying the data using a wireless system.

An overhead display system in an embodiment of the present invention may include a display and a guide bar wherein a media player is positioned at any interior part of the vehicle in addition to or other than the overhead console.

The display can be constructed using any of one or more display technologies. Examples of display technologies that can be used are: a liquid crystal display device (LCD), an electro-luminescent display device, a cathode-ray tube device and a gas plasma device, etc. Users may prefer a large display for enhanced viewing of entertainment like movies or video games. Also, large displays may be preferred in large vehicles (e.g., minivans, minibuses, large sport-utility vehicles, etc.) having multiple backseat rows of seating. A large display may block the rearview for the driver in part or in full.

Figure 1:
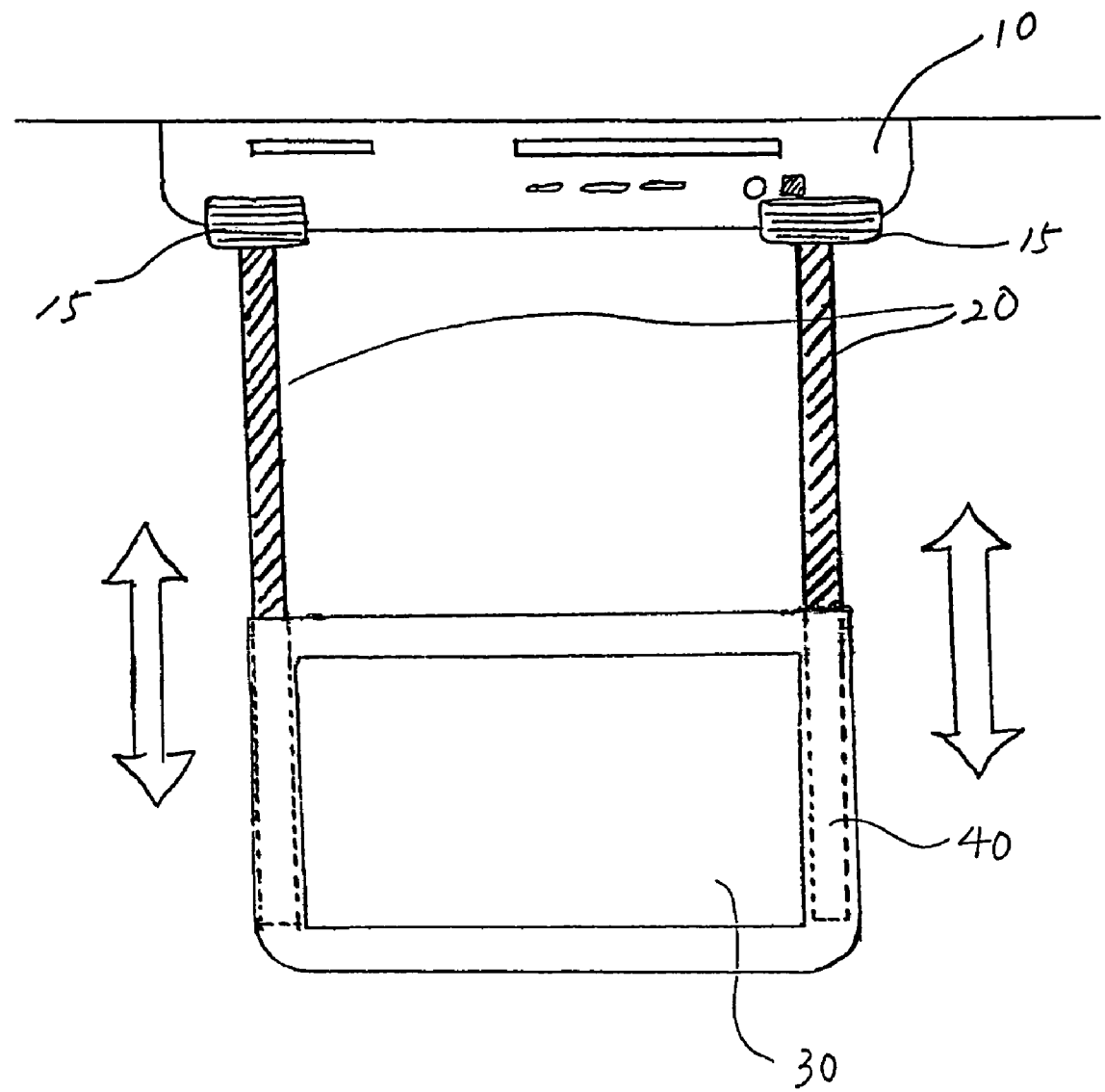
FIG. 1 shows an overhead display system according to an embodiment of the present invention.
Figure 3:
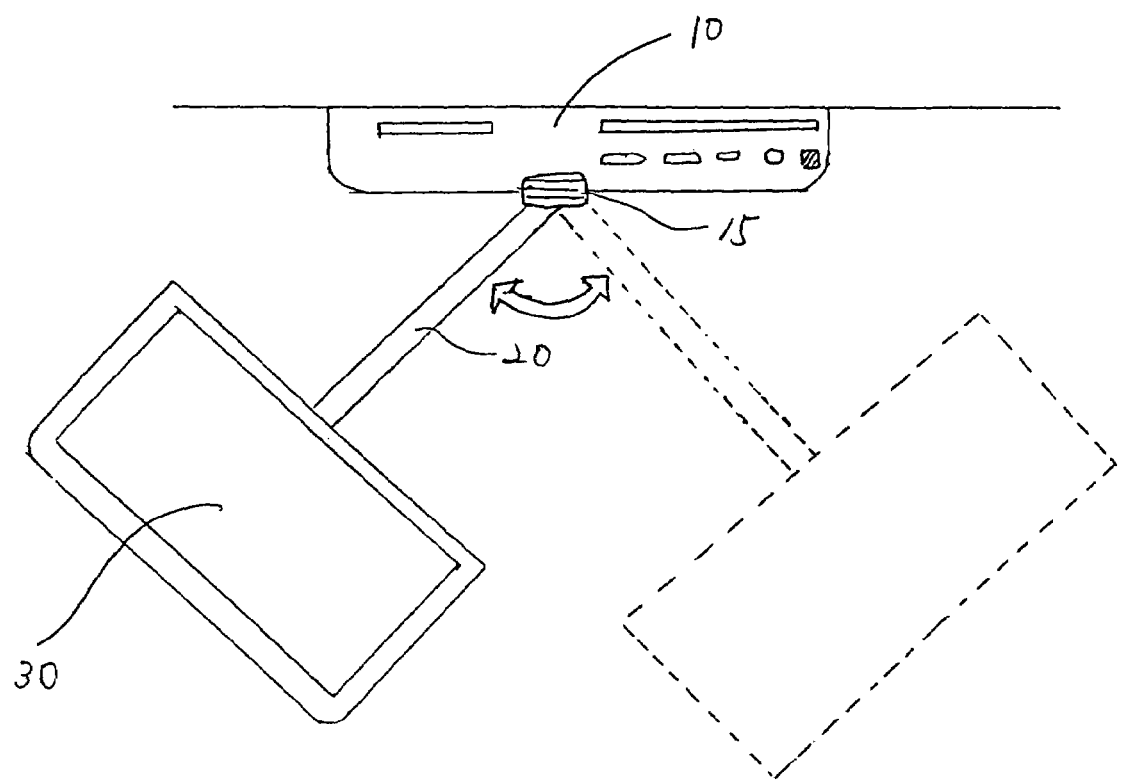
FIG. 3 shows movement of a guide bar and a display according to an embodiment of the present invention.
Figure 6:
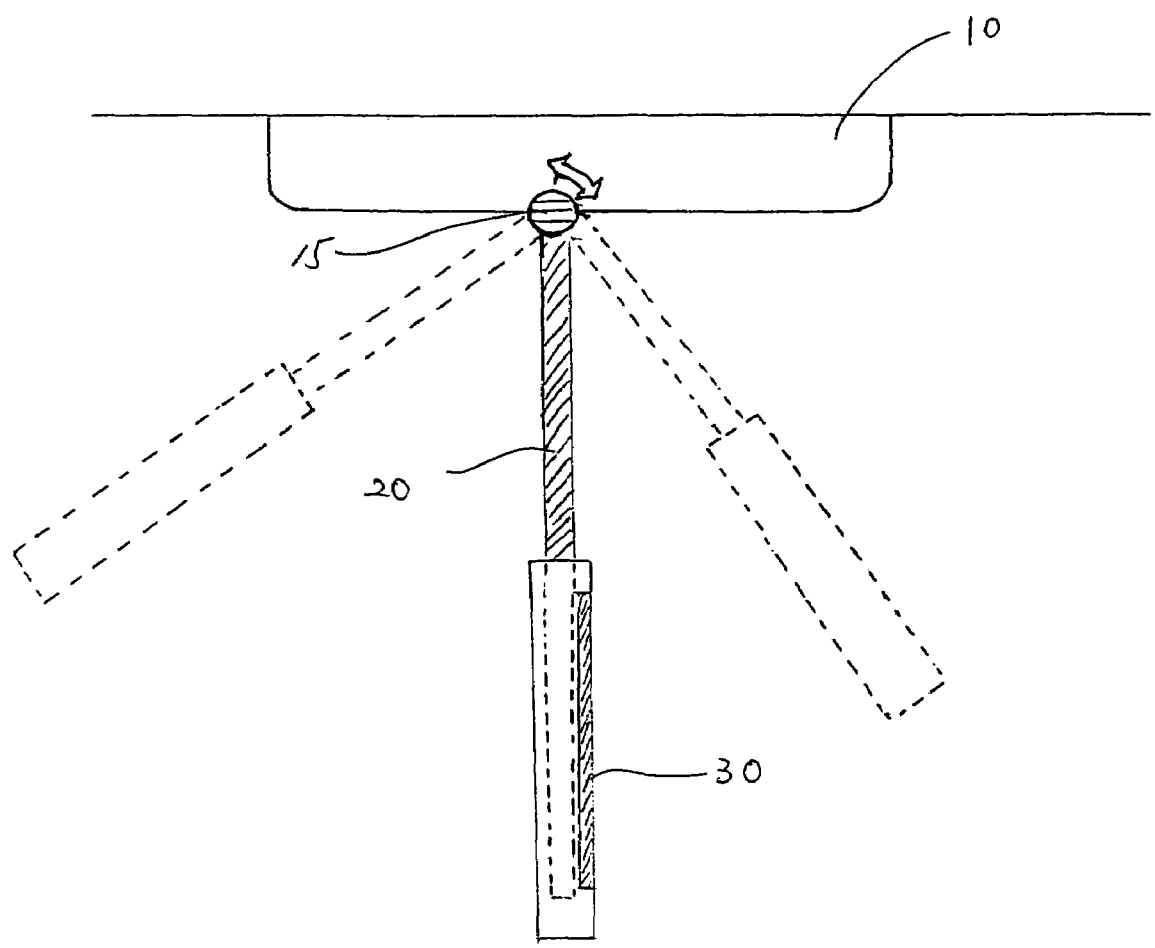
FIG. 6 shows movement of a guide bar and a display according to an embodiment of the present invention.
Figure 7:
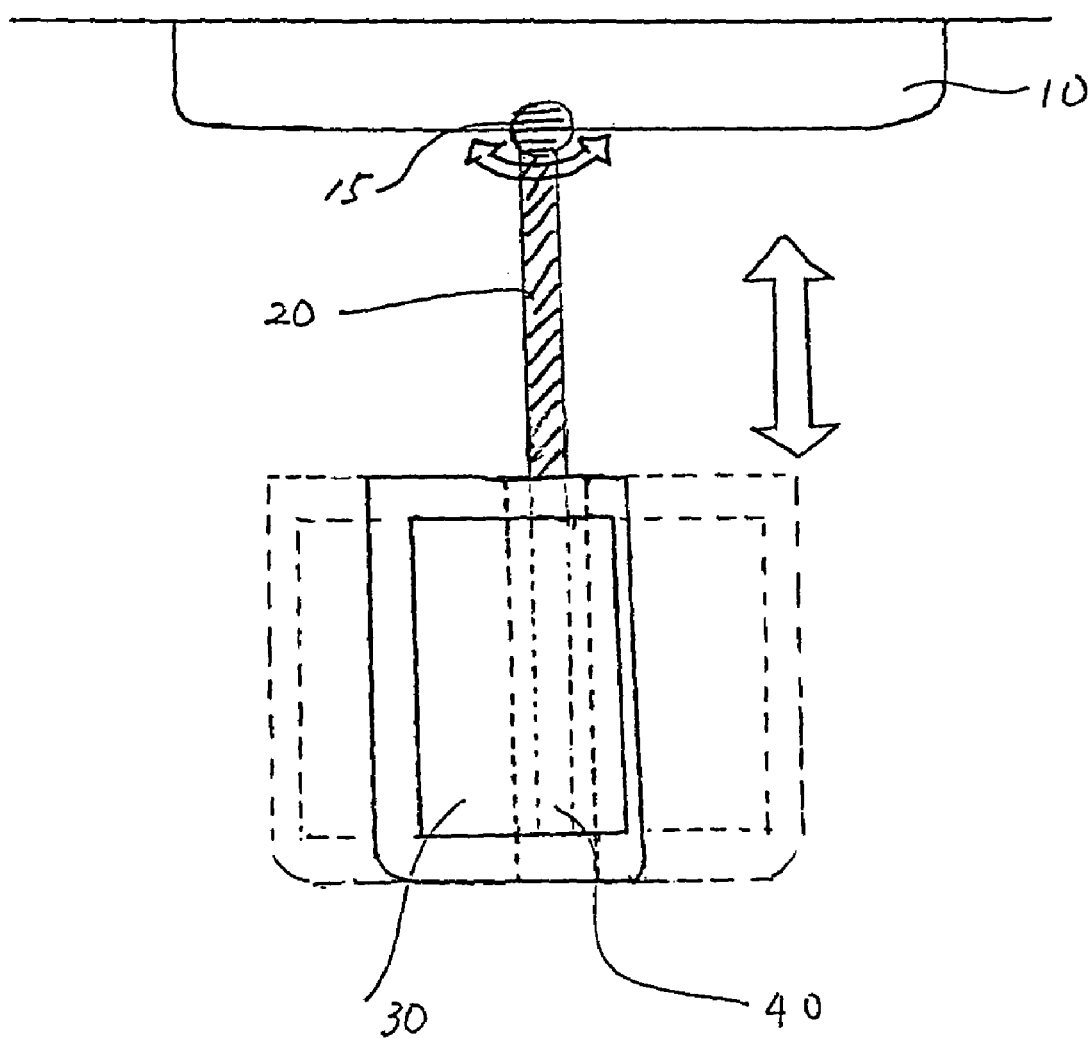
FIG. 7 shows movement of a guide bar and a display according to an embodiment of the present invention.
Figure 8:
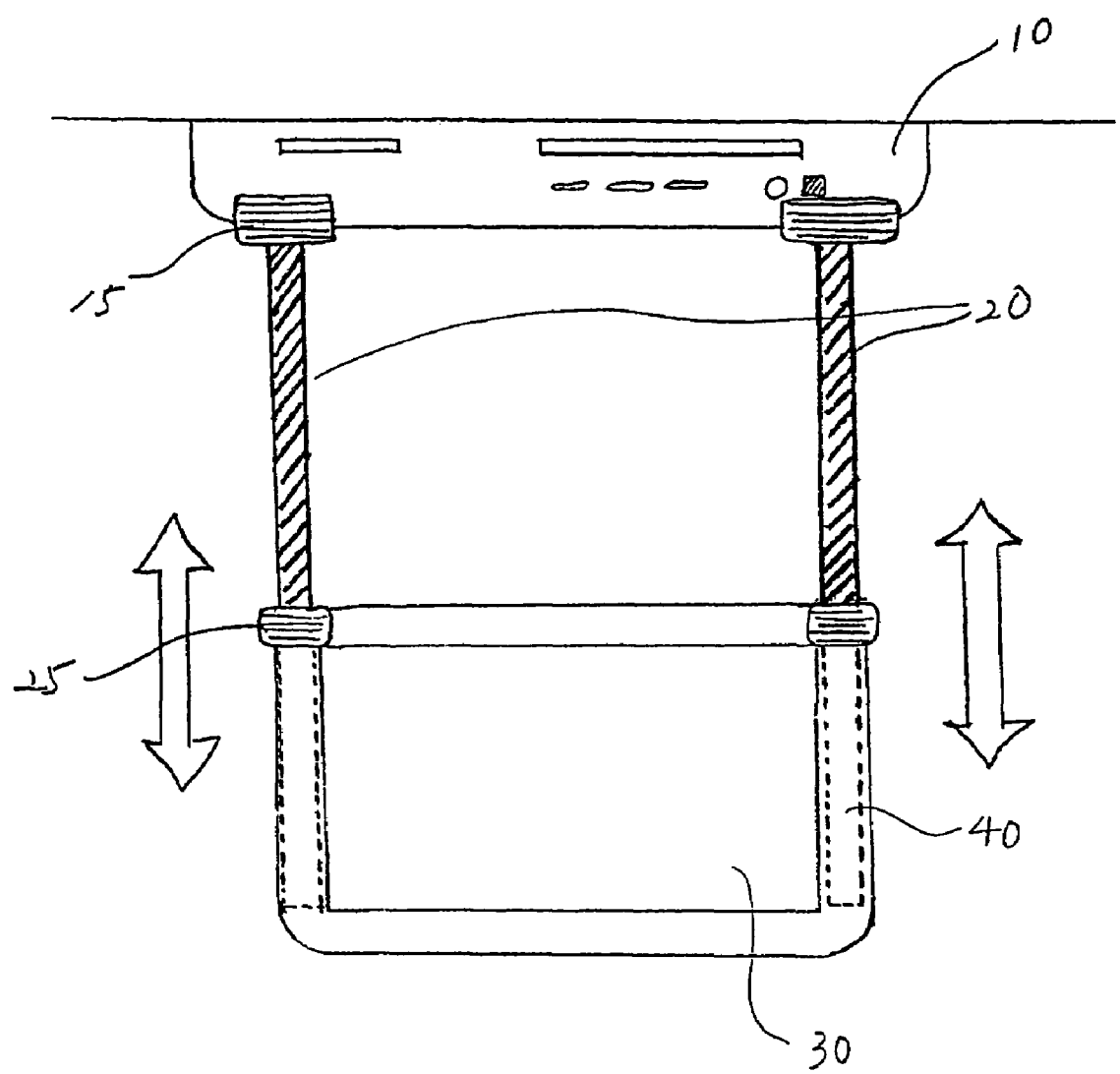
FIG. 8 shows an overhead display system according to an embodiment of the present invention.
Figure 9:
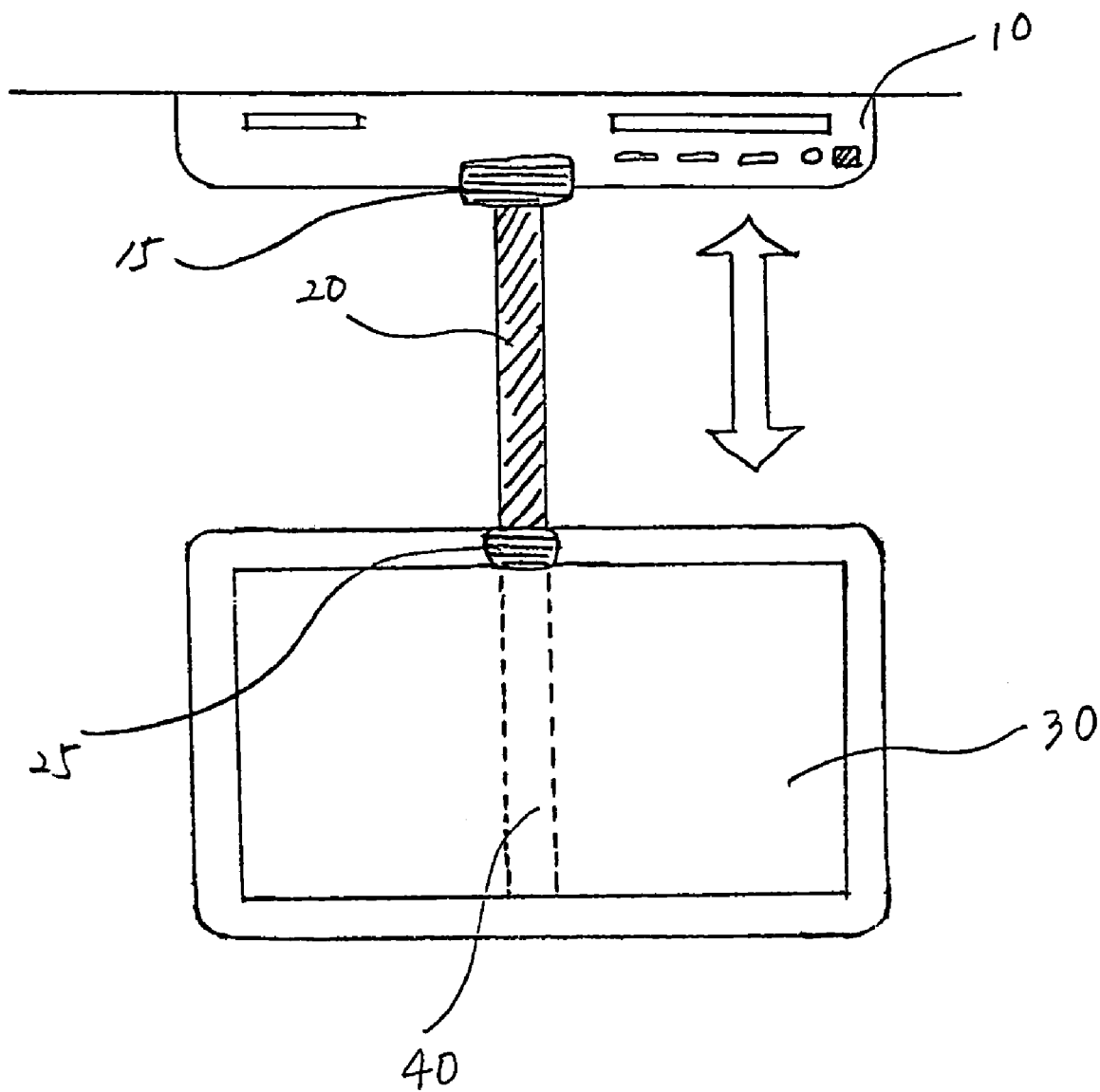
FIG. 9 shows an overhead display system according to an embodiment of the present invention.

FIG. 1 shows an overhead display system according to an embodiment of the present invention. The overhead display system includes an overhead console 10, a display 30 and two guide bars 20. The display 30 displays media content to the passengers in seating rows behind the driver. The two guide bars 20 are mounted to an overhead console 10 in a vehicle. The two guide bars 20 are mounted to the overhead console 10 using a hinge 15. The two guide bars 20 pivot with respect to the overhead console 10 using the hinge 15. Referring to FIGS. 3, 6 and 7, pivoting may be in the lateral direction (i.e., left to right), in the front to back direction, or around an axis defined by the guide bars(s) 20.

Figure 1B:
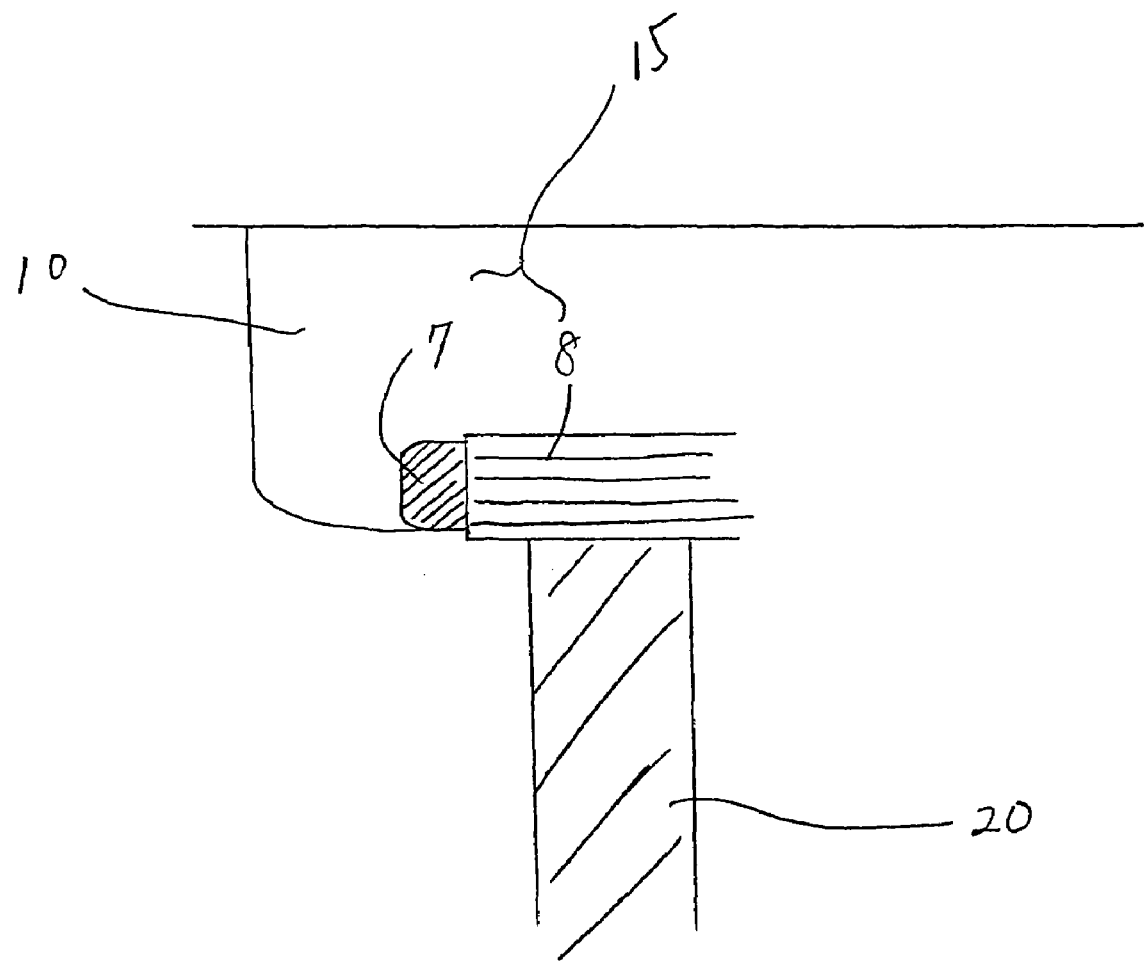
FIG. 1B shows an enlarged view of a hinge according to an embodiment of the present invention.

An enlarged view of the hinge 15 according to an embodiment of the present invention is shown in FIG. 1B. As shown in FIG. 1B, the hinge 15, according to an embodiment of the present invention, includes a hinge pin 7 and a hinge pin receiving part 8. The hinge pin receiving part 8 can swing relative to the hinge pin 7. The hinge 15 is preferably fixed to the console 10 using conventional methods, such as screws, molding, adhesives or the like.

Alternatively, the guide bars 20 can be mounted to the overhead console 10 in a fixed configuration such that the guide bars 20 do not pivot with respect to the overhead console 10. For example, the guide bars 20 may be molded to the overhead console 10 or fixed to the overhead console 10 using fixing devices such as screws, adhesive, latches or the like.

Figure 5:
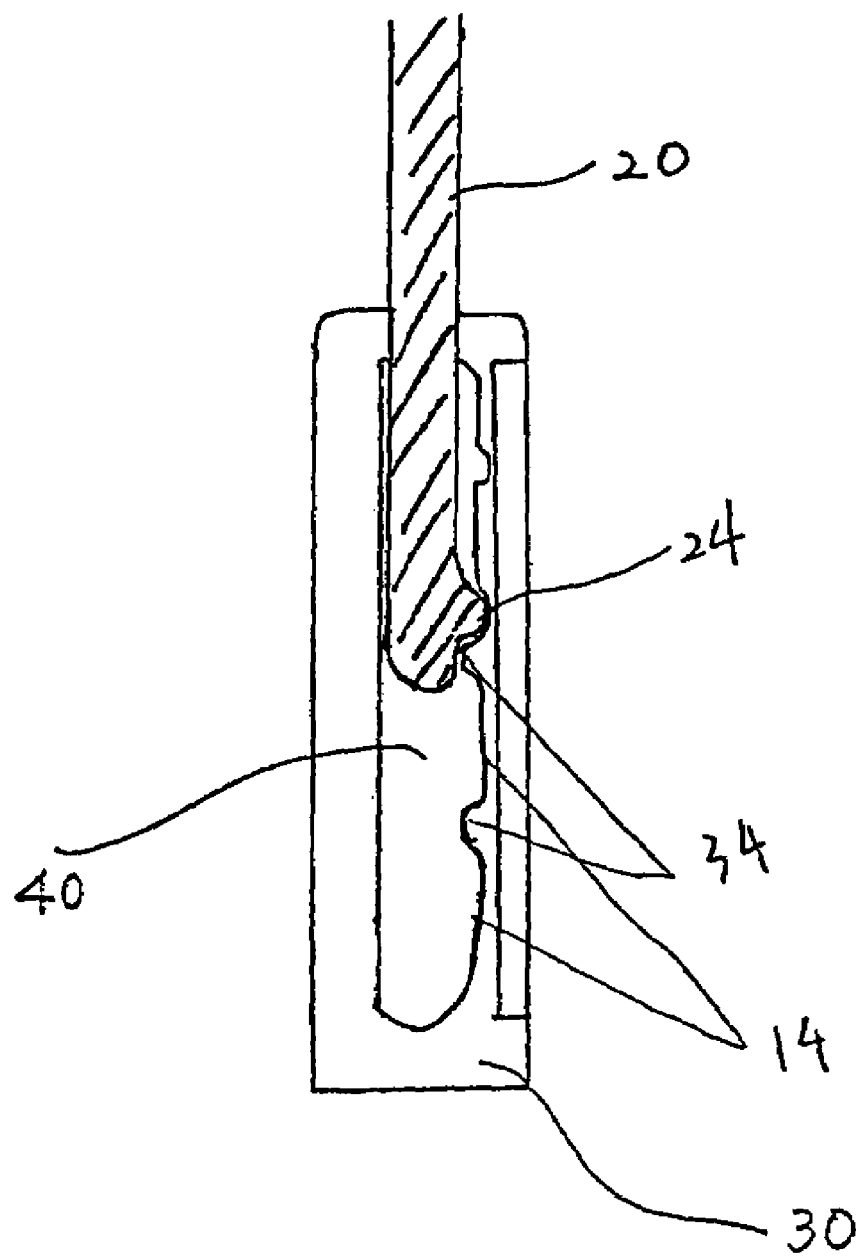
FIG. 5 shows a guiding mechanism according to an embodiment of the present invention.

Referring to FIGS. 1 and 5, the two guide bars 20 are coupled to either end of the display 30 using a guide bar receiving portion 40 for receiving the two guide bars 20 therein. The display 30 is capable of being moved along the two guide bars 40 in a vertical direction for locating an upper portion of the display 30 at a selected position on the two guide bars 20 so that the display 30 does not obstruct views behind the car. The selected position can be at or near a bottom end of the two guide bars when the display 30 is in a substantially extended position. The selected position can also be at or near a top end of the two guide bars when the display 30 is not extended.

Referring to FIG. 5, the guide bar 20 has an outwardly jutting tongue 24 at or near its bottom end. The guide bar receiving portion 40 has a cooperating rack profile with teeth 34 and tooth gaps 14. The rack profile cooperates with the tongue 24 such that stepping displacement of the display 30 relative to the guide bar 20 can be obtained. For example, to move the display 30 to the extended position relative to the overhead console 10, the rack is disengaged from the tongue 24 and the display 30 is pulled downward, with the tongue 24 then moving toward the upper end of the rack to fit in the upper-most gap 14.

Figure 4:
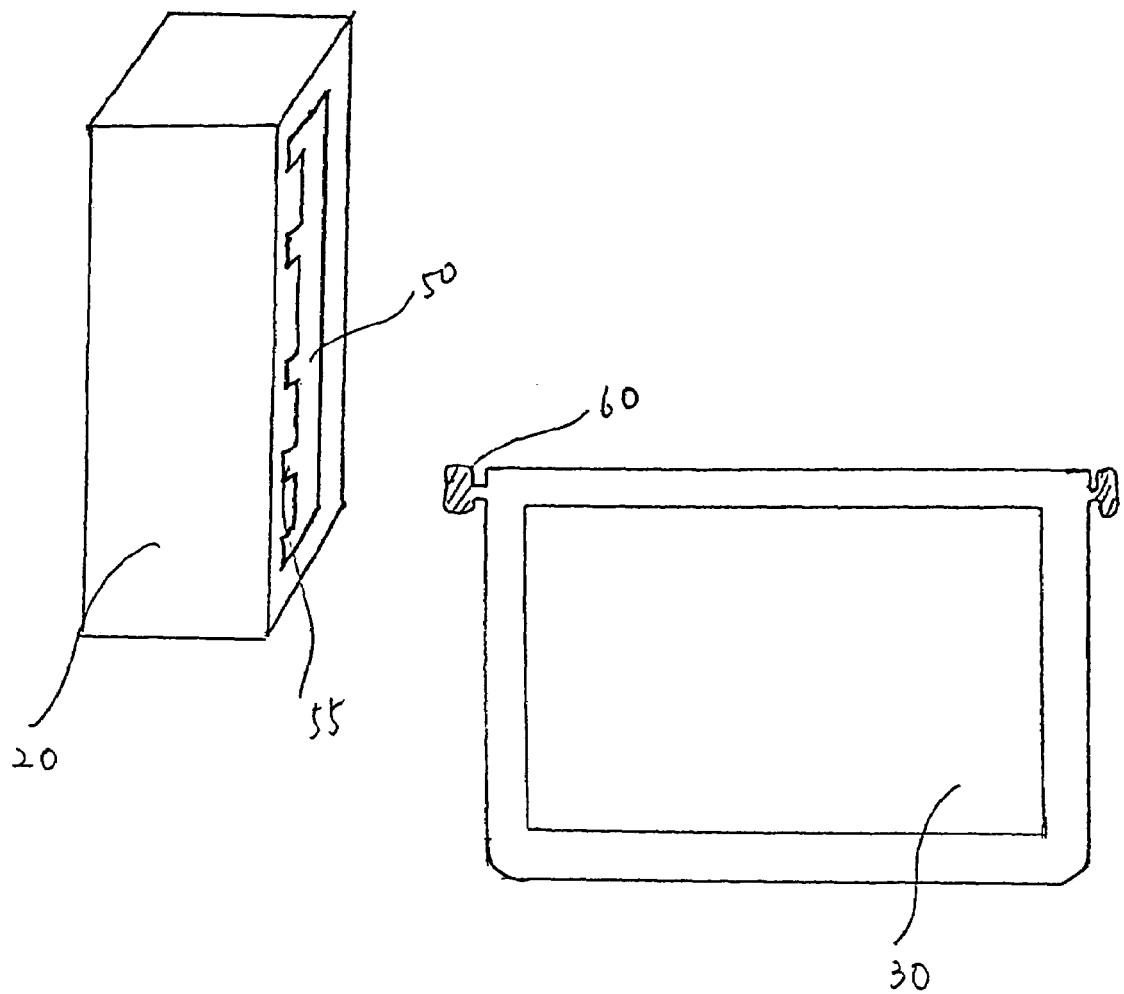
FIG. 4 shows a guiding mechanism according to an embodiment of the present invention.

Alternatively, as shown in FIG. 4, a groove 50 is formed in the guide bar 20 and extends between top and bottom ends of the guide bar 20. The display 30 includes a member 60 for fitting in the groove 50 of the guide bar 20 to guide movement of the display 30 along the guide bar 20. The groove 50 includes notches 55 for locking the member 60 and the display 30 at selected positions along the guide bar(s) 20. For example, the member 60 and the notch 55 coact to selectively latch the member 60 at the lower end of the guide bar 20 to maintain the display 30 in the substantially extended position. The notch 55, for example, can be a lateral notch. In forming the groove 50, it is preferable to include a plurality of notches 55 for locking the member 60 in a plurality of positions along the guiding bar 20. For a partially extended display 30, the member 60 may be engaged with an intermediate notch 55 of the groove 50. For releasing the display 30 from the guide bar 20, the display 30 is simply grasped and moved laterally to release the member 60 from a notch 55 to allow vertical movement of the display 30.

A rearview mirror (not shown) enables the driver to view a scene on the rear side of the car by providing a reflection of the image on the rear side of the car. The image in the rearview mirror is received as an optical view through a rear windshield (not shown). However, a driver of a vehicle having a large display that blocks the rear view would have to rely on side mirrors and guess work to perceive the objects or conditions on the rear side of the vehicle. This can lead to dangerous accidents. The vertical movement of the display 30 along the two guide bars 20 allows the driver to see the area behind the vehicle through the space between the overhead console 10 and the display 30 formed when the display 30 is either fully or partially extended. Irrespective of positions of the display 30, i.e., either fully or partially extended so as not to block the driver's rear view, passengers can continue to watch movies or video games from the display 30.

Figure 2:
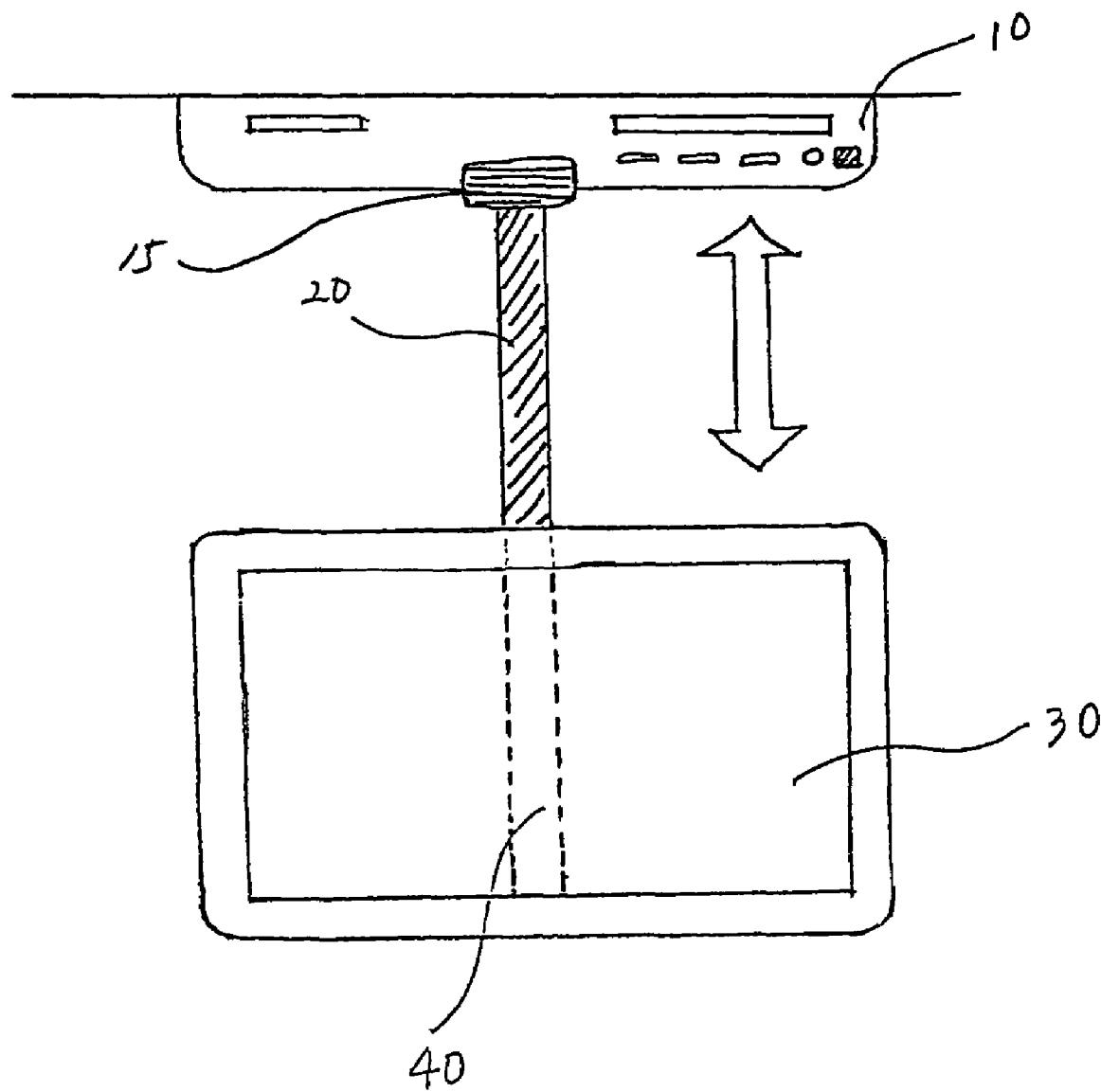
FIG. 2 shows an overhead display system according to an embodiment of the present invention.

FIG. 2 shows an overhead display system according to an embodiment of the present invention. The overhead display system includes a display 30 and a single guide bar 20. The single guide bar 20 is mounted to the overhead console 10 and pivots, via hinge 15, with respect to the overhead console 10. Alternatively, the guide bar 20 can be mounted to the overhead console 10 in a fixed configuration. The single guide bar 20 is coupled to a center portion of the display between the left and right ends of the display 30 using a guide bar receiving portion 40 for receiving the single guide bar 20 therein. Alternatively, a configuration similar to that described in FIG. 4 can be used, wherein a member 60 protrudes from a rear panel of the display 30 to fit in a groove 50 of the guide bar 20. The movement of the display 30 along the single guide bar 20 in a vertical direction for locating the display 30 at a selected position on the single guide bar 20 is essentially the same as the movement described above with respect to FIG. 1. The vertical movement of the display 30 along the single guide bar 20 allows the driver to see the area behind the vehicle through the back window.

FIG. 3 shows a movement of the guide bar 20 and the display 30 according to an embodiment of the present invention. The display 30 suspended by the guide bar 20 can swing in left and right directions using the hinge 15. The hinge 15 may require that a predetermined force be exerted on the display before permitting movement. Such a requirement permits movement of the display 30 in a side to side direction if the display 30 is contacted due to, for example, accidental contact with a passenger resulting from an accident. Accordingly, the display 30 may be moveable to prevent injury to a passenger, but will not move due to torques created from bumps in the road or as a result of sharp turns.

Similarly, FIG. 6 shows forward and rearward movement of the guide bar 20 and the display 30 according to an embodiment of the present invention. The guide bar 20 pivots with respect to the overhead console 10 in a range of angles from about 0° to about 180° using the hinge 15. Like the embodiment described in connection with FIG. 3, the hinge 15 may require a predetermined force to be exerted on the display 30 before permitting movement, such that the display 30 is moved in the forward or rearward direction to avoid injury to a passenger.

Referring to FIG. 7, the guide bar 20 is capable of rotating about an axis defined by the guide bar 20. The display 30, through rotation of the guide bar 20, is capable of rotating about an axis defined by the guide bar 20 so that the display 30 can be rotated to improve a passenger's viewing angle or a driver's light of sight. Like the embodiments described in connection with FIGS. 3 and 6, the hinge 15 may require sufficient torque for rotation such that the display is not jostled out of position by movement of the vehicle.

The hinge 15 may be any hinge sufficient to allow movement along multiple axes, (e.g. x, y, z or combination thereof) such as a ball and socket type joint.

Referring to FIGS. 8-12, embodiments similar to FIGS. 1-7 are shown. FIGS. 8-12 include the addition of a hinge mechanism 25 permitting the display 30 to be rotated or pivoted independent of or with rotation or pivoting of the guide bar 20. For example, referring to FIG. 10, lateral movement of the display 30 allows the driver to see an area behind the vehicle through the back window. In addition, the viewer can adjust the position of the display 30 by pulling the display 30 in his direction, thereby enjoying a closer view from the display 30.

Figure 10:
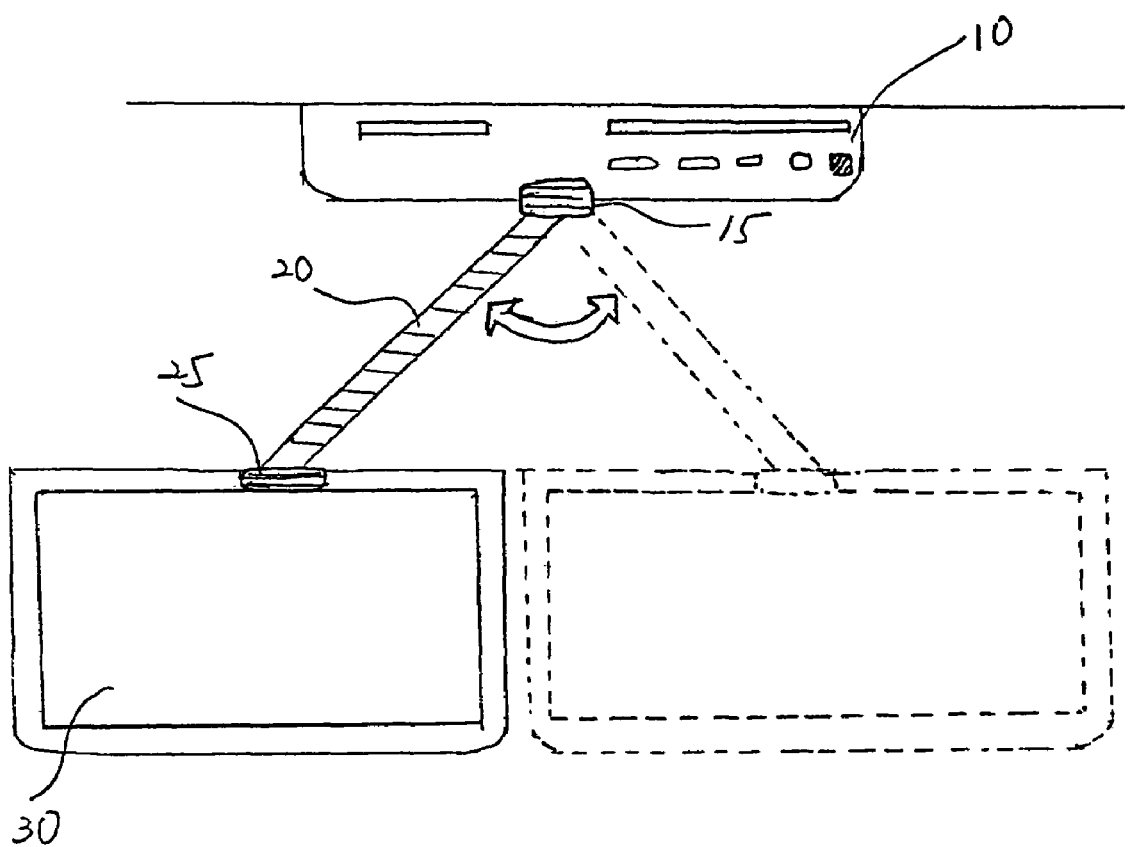
FIG. 10 shows movement of a guide bar and a display according to an embodiment of the present invention.
Figure 11:
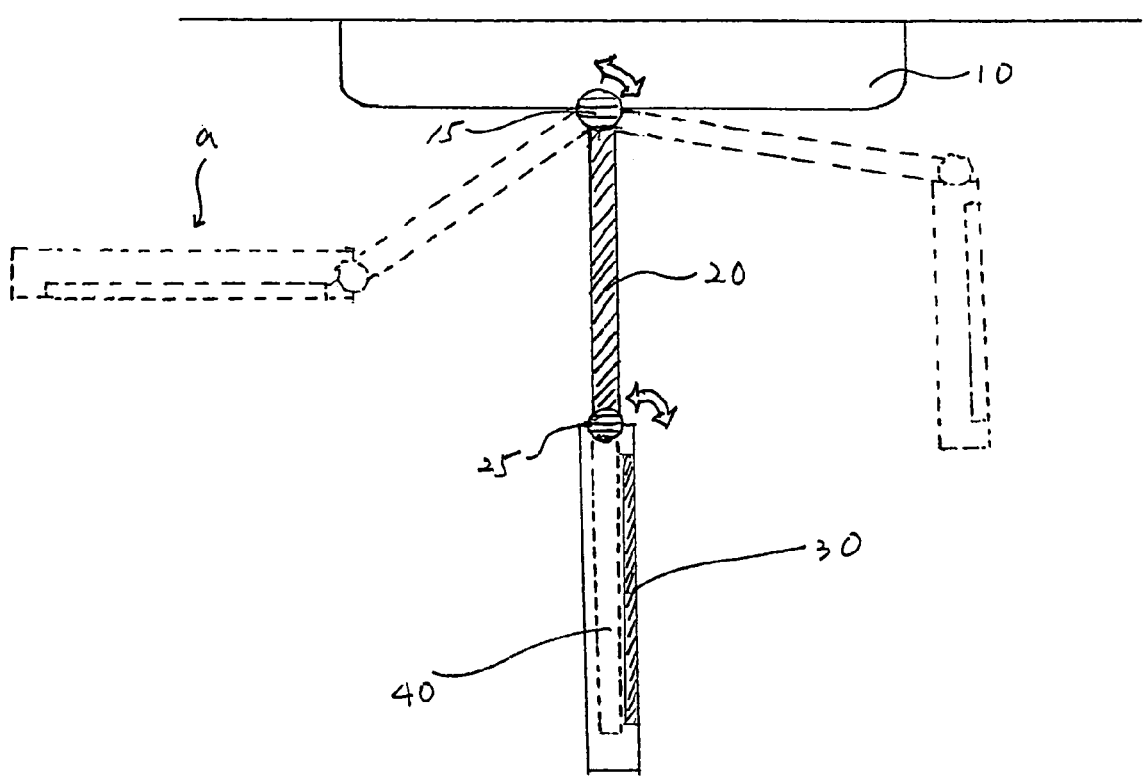
FIG. 11 shows movement of a guide bar and a display according to an embodiment of the present invention.
Figure 12:
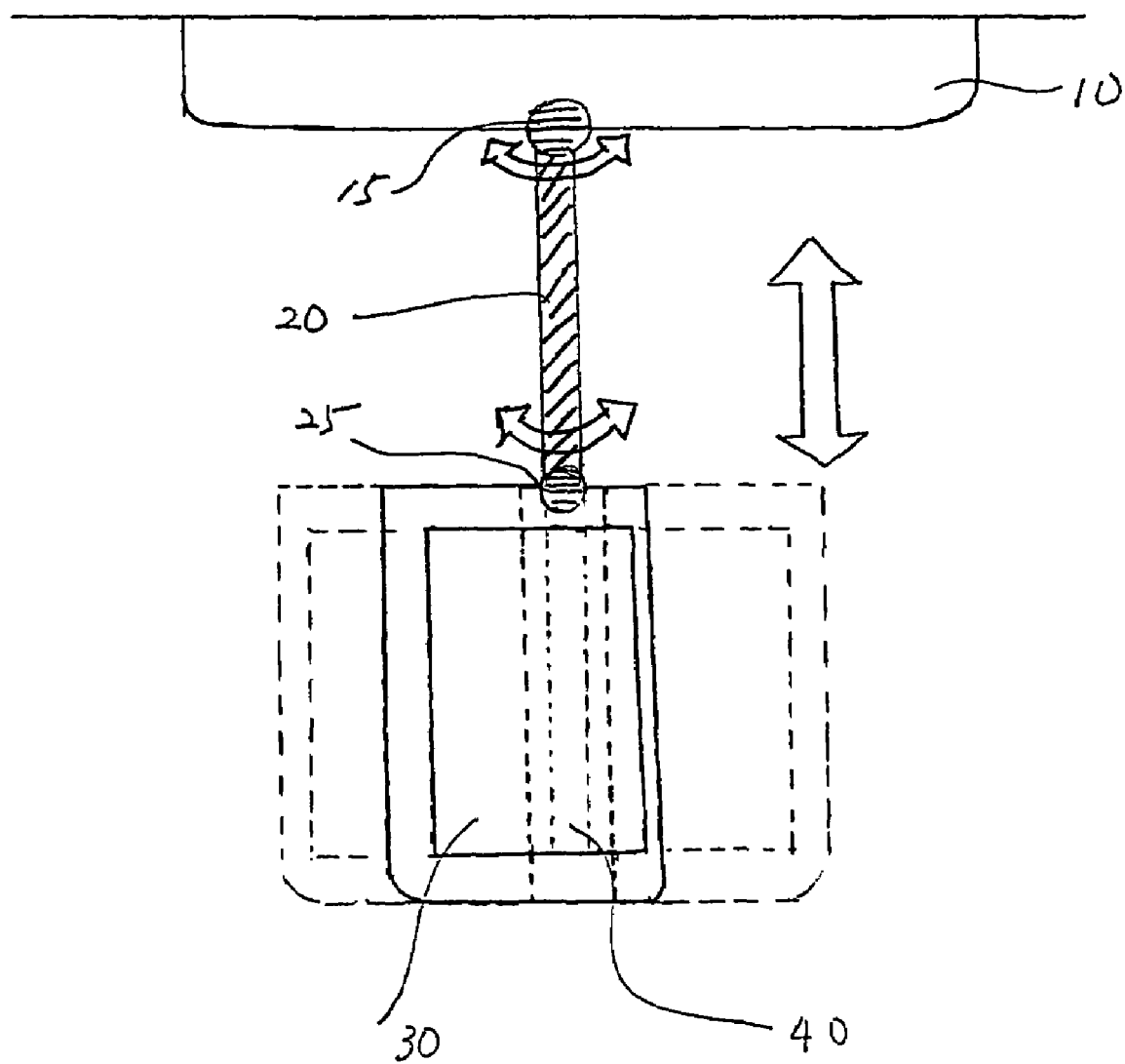
FIG. 12 shows movement of a guide bar and display according to an embodiment of the present invention.

Like the hinge 15, the hinge 25 can require a predetermined force before permitting movement so as to allow the display to remain in a desired position while the vehicle is in motion. Further, as shown in FIGS. 10-12, the hinge 25 may permit movement in any one or combination of x, y and z axes with respect to the bottom end of the guide bar 20.

The hinge 25 is preferably fixed to the display 30 using conventional fixing methods or devices such as screws, molding, adhesives or the like. The guide bar 20, once released from the guide bar receiving portion 40 or the member 60, can be fixed to the hinge 25 using for example, a press fit mechanism and/or a locking device (e.g., carter pin) which engages both the hinge 25 and the guide bar 20.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An overhead display device for a vehicle comprising:
   a guide bar; and
   a display coupled to the guide bar,
   wherein the display is capable of being moved along the guide bar in a vertical direction for locating the display at a selected position on the guide bar.

2. The overhead display device as recited in claim 1, wherein the guide bar is mounted to an overhead console.

3. The overhead display device as recited in claim 2, wherein the guide bar pivots with respect to the overhead console.

4. The overhead display device as recited in claim 3, wherein the guide bar pivots in a range of angles from about 0° to about 180°.

5. The overhead display device as recited in claim 1, wherein the selected position is at or near a bottom end of the guide bar.

6. The overhead display device as recited in claim 1, wherein the selected position is at or near a top end of the guide bar.

7. The overhead display device as recited in claim 1, wherein the display includes a guide bar receiving portion for receiving the guide bar therein.

8. The overhead display device as recited in claim 7, wherein the guide bar includes a member for engaging a mating area in the guide bar receiving portion.

9. The overhead display device as recited in claim 1, wherein the display is capable of pivoting about an end of the guide bar.

10. The overhead display device as recited in claim 1, wherein the guide bar is capable of rotating about an axis defined by the guide bar.

11. The overhead display device as recited in claim 1, wherein the display is capable of rotating about an axis defined by the guide bar.

12. The overhead display device as recited in claim 1, further comprising a groove extending between top and bottom ends of the guide bar.

13. The overhead display device as recited in claim 12, wherein the display includes a member for fitting in the groove of the guide bar to guide movement of the display along the guide bar.

14. The overhead display device as recited in claim 13, wherein the groove includes a notch for locking the member.

15. The overhead display device as recited in claim 13, wherein the groove includes a plurality of notches for locking the member in a plurality of positions along the guiding bar.

16. The overhead display device as recited in claim 1, wherein the guide bar is positioned at a center portion of the display with respect to left and right ends of the display.

17. An overhead display device for a vehicle comprising:
    a guide bar pivotally mounted to an overhead console of the vehicle; and
    a display coupled to the guide bar,
    wherein the display is capable of being moved along the guide bar for locating the display at a selected position on the guide bar.

18. The overhead display device as recited in claim 17, wherein the guide bar pivots with respect to the overhead console.

19. The overhead display device as recited in claim 18, wherein the guide bar pivots in a range of angles from about 0° to about 180°.

20. The overhead display device as recited in claim 17, wherein the selected position is at or near a bottom end of the guide bar.

21. The overhead display device as recited in claim 17, wherein the selected position is at or near a top end of the guide bar.

22. The overhead display device as recited in claim 17, wherein the display includes a guide bar receiving portion for receiving the guide bar therein.

23. The overhead display device as recited in claim 22, wherein the guide bar includes a member for engaging a mating area in the guide bar receiving portion.

24. The overhead display device as recited in claim 17, wherein the display is capable of pivoting about an end of the guide bar.

25. The overhead display device as recited in claim 17, wherein the guide bar is capable of rotating about an axis defined by the guide bar.

26. The overhead display device as recited in claim 17, wherein the display is capable of rotating about an axis defined by the guide bar.

27. The overhead display device as recited in claim 17, further comprising a groove extending between top and bottom ends of the guide bar.

28. The overhead display device as recited in claim 27, wherein the display includes a member for fitting in the groove of the guide bar to guide movement of the display along the guide bar.

29. The overhead display device as recited in claim 27, wherein the groove includes a notch for locking the member.

30. The overhead display device as recited in claim 27, wherein the groove includes a plurality of notches for locking the member in a plurality of positions along the guide bar.

31. The overhead display device as recited in claim 17, wherein the guide bar is positioned at a center portion of the display with respect to left and right ends of the display.

32. An overhead display device for a vehicle comprising:
a display; and
two guide bars coupled at or near respective first and second ends of the display,
wherein the display is capable of being moved along the two guide bars in a vertical direction for locating the display at a selected position on the two guide bars, and the display includes a guide bar receiving portion for receiving the guide bar therein.

* * * * *